(12) United States Patent  
Albizuri

(10) Patent No.: US 7,156,370 B2
(45) Date of Patent: Jan. 2, 2007

(54) ROTARY VALVE IN A MULTI-GAS COOKER

(76) Inventor: Iñigo Albizuri, Calle Uno, No. 736 Z.I., 44940 Guadalajara-Jalisco (MX)

( * ) Notice: Subject to any disclaimer, the term of this patent is extended or adjusted under 35 U.S.C. 154(b) by 61 days.

(21) Appl. No.: 11/106,881

(22) Filed: Apr. 14, 2005

(65) Prior Publication Data
US 2006/0175566 A1 Aug. 10, 2006

(30) Foreign Application Priority Data
Feb. 10, 2005 (ES) ............... U-200500309

(51) Int. Cl.
F16K 3/32 (2006.01)
F16K 5/02 (2006.01)

(52) U.S. Cl. ............ 251/207; 251/206; 137/269; 126/39 E

(58) Field of Classification Search ........... 251/206, 251/207, 208, 209, 286, 287; 137/269; 126/39 E; 431/354
See application file for complete search history.

(56) References Cited

U.S. PATENT DOCUMENTS 2,101,356 A * 12/1937 Zak ..................... 251/207
2,987,078 A * 6/1961 Du Perow ......... 137/599.17
5,009,393 A * 4/1991 Massey ................ 251/207

* cited by examiner

Primary Examiner—Edward K. Look
Assistant Examiner—John K. Fristoe, Jr.
(74) Attorney, Agent, or Firm—The Kline Law Firm

(57) ABSTRACT

The cooking appliance (1) having a control panel (2) is equipped with one or more gas flow (Q) regulating valves, wherein the rotary regulator organ (6) is provided with various peripheral through holes (16–19). The control knob (9) being interchangeable for fitting to the actuating shaft (7), is chosen from the two units available, one and the other permitting different angular limit positions (A2, A3) for the supply of a constant minimum gas flow Qmin, through one of two successive holes (18, 19) calibrated each one for a different type of gas NG or LPG, one or the other hole being superimposed to a valve inlet duct (4) at a different angular position A2, A3. An integral lug (14) on the control knob (9) running into a slide groove (20) in the control panel (2), establishes a first rotation stop A2.

3 Claims, 2 Drawing Sheets

ROTARY VALVE IN A MULTI-GAS COOKER

TECHNICAL FIELD

The present invention relates to a gas tap of the tapered rotary plug type attached to a rotary actuating shaft, being the gas tap mounted on the panel of a cooking appliance, wherein the rotary plug is provided with a series of openings for adjusting the flow rate according to the fuel gas family supplied to the cooking appliance.

PRIOR ART

Gas taps of the above-defined type, provided with a dome-shaped bearing bush guiding the rotation of the actuating shaft and fulfilling at the same time the function of a cover for the hollow tap body, are already known. The gas tap is mounted on the front control panel with the actuating shaft passing through a external control panel in the appliance, and the tap body resting inside the appliance connected to a fuel gas supply tube or nipple. The external free end of the actuating shaft is fitted with a rotary control knob inserted in the latter. The control knob is removable from the shaft by pulling it out. The hollow body of the tap has its own gas outlet conduit which is connected to the respective appliance burner.

An example of rotary tap of the above type is disclosed in EP-0805310-A1, having its actuating shaft coupled to a frusto-conical regulating organ or plug, which is able to rotate a given angle for the supply of a gas flow from two angular positions spaced around 120° apart, corresponding respectively to a high or maximum flow "Qmax" and to a low or minimum flow "Qmin", the latter applied to "gentle boiling". The rotation of the shat as far as one of the angular positions, is started from an initial valve closed "OFF" position.

In this type of known taps the actuating shaft has a pin protruding in a radial direction to limit its angular travel, guided on a circular surface in the inner face of the body cover or some other part of the valve body. The total travel of the regulating plug thus limited is, for instance, 210° from the OFF position. The end position corresponds to Qmin. Any of the flows Qmax, Qint—intermediate flow—and Qmin is regulated by way of a corresponding hole or groove in the regulating organ facing the outlet conduit. All the flow rate are supplied from a common inlet conduit through an inner chamber in the regulating organ which is in communication with an outlet conduit. The Qmin outlet hole has an area of calibrated section for a standard type of given fuel gas, adjusted according to the output power of the cooking appliance burner.

Solutions are already known for a single tap to be mounted on cooking appliances that use two different types of gas, such as natural gas (NG) or liquefied petroleum gas (LPG). For example, in U.S. Pat. No. 5,009,393 an additional valve element in the form of a sleeve, is inserted in the inner chamber of the tapered regulating organ. The area of the opening section for the passage of gas flow towards the outlet, that which corresponds to low flow or minimum flow Qmin, is adjusted by rotating this added valve sleeve which thus modifies the uncovered section area of the outlet opening.

This known solution has the disadvantage that for adjusting the Qmin for the rotation of the valve sleeve, it is necessary to use a screwdriver, which has to be inserted from an opening in the actuating shaft until it reaches the valve sleeve and to transmit a precise turn.

DISCLOSURE OF THE INVENTION

The object of the invention comprises a gas tap for a domestic cooking appliance of the type with a frusto-conical regulating organ coupled to an actuating shaft and to a rotary control knob, which is capable of supplying different required flows of gas lying between two angular limit positions, of either of the two different types of gas, N gas or LP gas, the tap having a dual means for limiting the angle of rotation of the regulating organ, and the control knob being interchangeable on the actuating shaft, which depending on the type of gas used by the appliance can be or not provided, with a means for guiding the rotation in cooperation with a means for limiting the rotation provided on a panel on the cooking appliance.

The gas valve according to the invention is capable of providing two angular positions of the regulating organ, both spaced apart from each other to supply a different minimum flow Qmin according to the type of gas, NG or standard LPG, used as the fuel for the appliance. For this purpose the regulating organ has two successive Qmin outlet holes spaced apart in the angular direction, which face up individually with the inlet hole in the tap body, being the two different angular positions established by means of a respective rotation stop.

The use of a single valve for regulating the flow of two different gas families is an advantage of the gas valve invention, when mounted on a cooking appliance. During the start-up of the cooking appliance the user only has to carry out a choice for a control knob from the two possible units accompanying the valve in accordance with the type of fuel gas NG or LP appropriate for the cooking appliance. In this way, it is not necessary to use tools for adjusting the flow, nor to learn how to adjust the regulating organ as is required in the prior art valve.

DETAILED DESCRIPTION OF AN EMBODIMENT OF THE INVENTION

Figure 1:
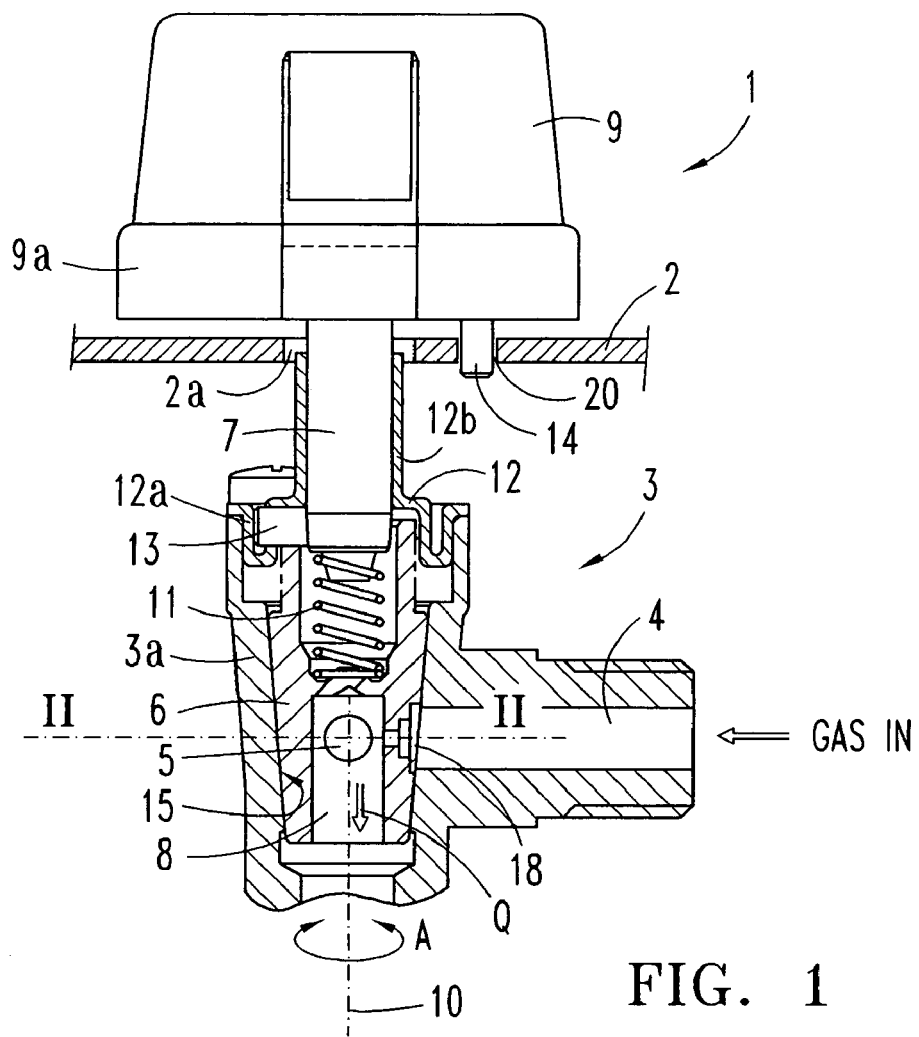
FIG. 1 is a sectional view of a gas valve fitted on a panel of a cooking appliance according to the invention.

With reference to FIGS. 1–4, an embodiment of a gas cooking appliance 1 such as a barbecue has a control panel 2 on which are mounted one or more rotary gas valves of an existing general type. The cooking appliance 1 may be of two types in respect of the type of gas supplied, natural gas (NG) or liquefied gas (LPG) from the external source—GAS IN—through a valve inlet conduit 4 in the valve body 3a. Each one of the valves 3 mounted on the panel 2 is always of a single type, all with a same valve body 3a and a same frusto-conical regulating organ 6. The inlet flow "Q" is transmitted to an internal chamber 8 in regulating organ 6 in communication with an outlet conduit 5 in the valve body 3a. The regulating organ 6 rotates around a central axis 10 actuated by shaft 7 for the supply of the flow "Q", which is directed towards a burner on the appliance (not shown in the drawings), being the latter specifically adapted to either N gas or LP gas.

The valve body 3a has an elongated shape with a similarly frusto-conical central housing cavity 15, wherein the regulating organ 6 is pushed by a spring 11 for a tight sealing. The free end of the actuating shaft 7 is installed passing through a hole 2a in the appliance panel 2, and afterwards the user fits it with a control knob 9, which is chosen from the two different units of control knob 9, both supplied to the user with each valve unit 3. A cover 12 protecting the housing cavity 15, has a tubular bushing 12b for guiding the actuating shaft 7 in rotation.

The regulating organ 6 may rotate with the shaft 7 an angle "A" in either of the two directions from an initial angular "OFF" position corresponding to the valve closed condition, to an angle A larger than 180° and smaller than 360°. The OFF position is the initial end of the rotational travel "A", and it is established by a radial pin 13 on the shaft. The cover 12 presents a sliding surface for the radial pin 13, extending in a rotating arc "A3" which ends in a recess 12a in the cover, which acts as a stop for the rotation of the radial pin 13.

Figure 2:
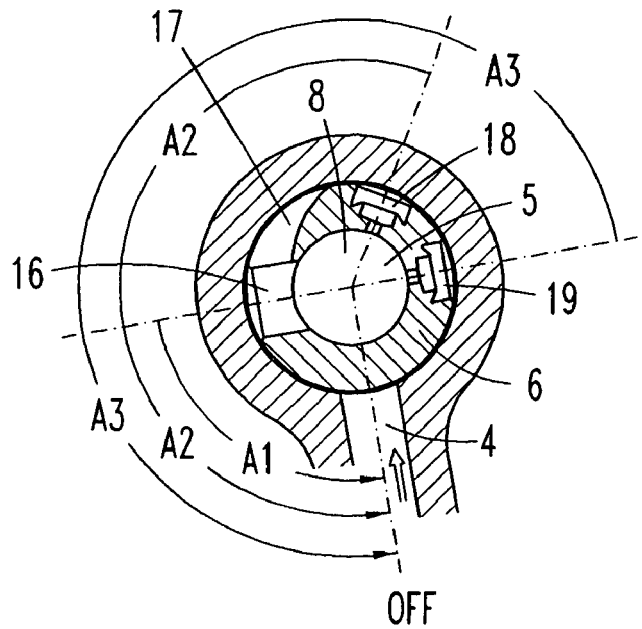
FIG. 2 is a sectional view of the valve regulating organ according to line II—II of FIG. 1.
Figure 3:
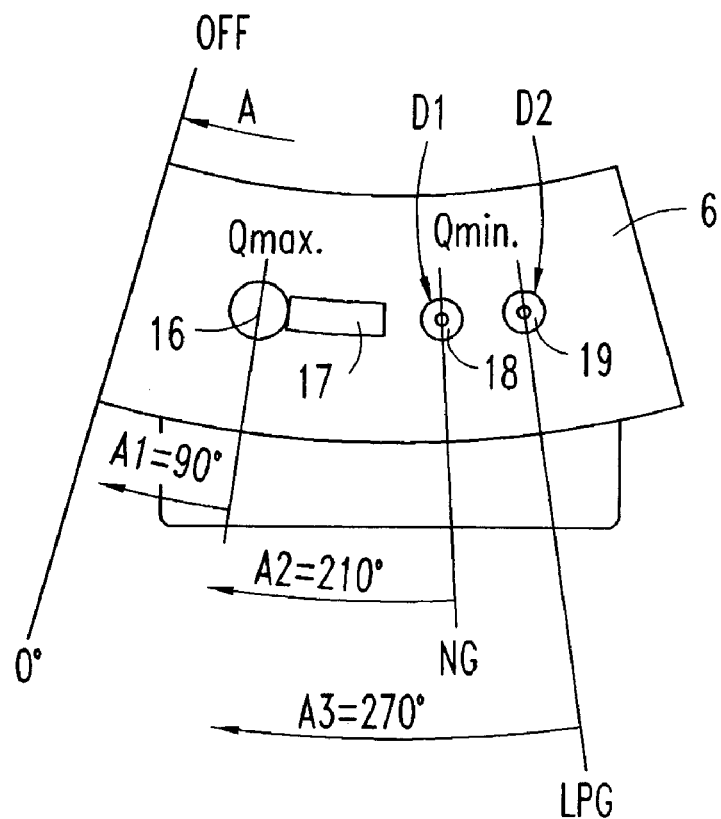
FIG. 3 is a development view of the valve regulating organ of FIG. 2.
Figure 4:
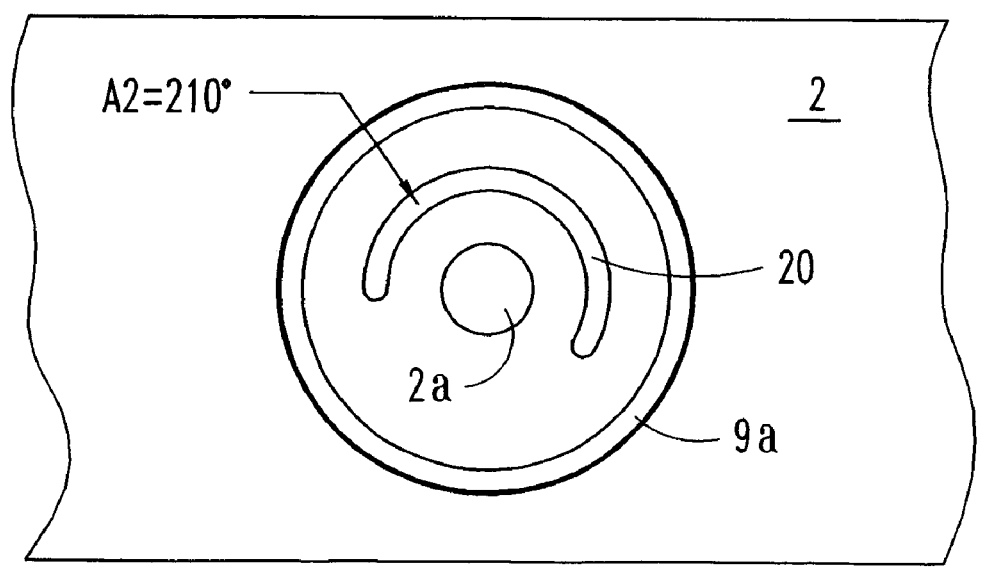
FIG. 4 is a front view of the valve installation panel according to FIG. 1.

FIGS. 2 and 3 show an embodiment of the cooking appliance 1 described here. From the angular position OFF rotating in a clockwise direction, the frusto-conical organ 6 may regulate the supply of different gas flows, a maximum flow "Qmax", a minimum "Qmin" and an intermediate flow "Qint" between the Qmax and the Qmin, in function of the angle rotated "A". A constant minimum flow "Qmin" of the N gas must be higher than a "Qmin" of the LP gas, when supplied to a respective burner in both cases of the same power. In function of whether N or LP gas is supplied to the cooking appliance, the control knob 9 to be fitted on the actuating shaft 7 is distinguished by means of a lug 14 integral with the control knob. The control knob 9 represented on the appliance in FIG. 1 is adapted for the supply of N gas, having a protuberance or lug 14 projecting from a knob base 9a facing the panel 2. The second type of control knob 9 having not the protuberance 14 (not shown in the drawings), is chosen for its mounting on a cooking appliance that uses LPG.

In reference to FIGS. 2 and 3, the regulating organ 6 rotates to an angular position A1=90 degrees, for the supply of a maximum flow "Qmax" of either NG or LPG on both types of cooking appliance 1. In this angular position A1, the Qmax inflow is regulated by a through hole 16 in the regulating organ, facing the inlet conduit 4. If the regulating organ 6 is rotated further, an intermediate flow "Qint" will be supplied by way of an ensuing flow opening 17 in the form of a groove which has a decreasing area. Being substantially lower than the Qmax, the "Qint" flow is diminishing in accordance with the angle A rotated, until a through hole 18 for a "Qmin" flow is facing the inlet conduit 4 at an ensuing angular position A2=210 degrees. The diameter D1 of this hole 18 is calibrated for the supply of a Qmin of NG.

On the NG type cooking appliance, the control knob provided with the lug 14 cannot turn through an angle larger than A2. The control panel 2 (FIG. 4) has a circular groove 20 travelled by lug 14 of control knob 9. Its extension A2=210 degrees imposes the limit of angular travel governing the regulating organ 6, from the OFF position to the outlet of the NG Qmin flow by way of hole 18.

When installed on the panel 2, the control knob unit 9 chosen for the supply of LPG, this has no lug 14 or any other element limiting the angle "A" of rotation. Thus, the regulating organ 6 may rotate as far as an angular position A3=270 degrees, located farther away from the initial OFF position than the prior position "A2", until a second through hole 19 lines up with the inlet conduit 4. The diameter D2 of hole 19 is calibrated for the supply of a predetermined LPG "Qmin" flow.

Similarly, the regulating valve 3 and its rotary regulating organ 6 may be constructed with through holes 16–19, which are superimposed for regulation to a valve outlet conduit, instead of to the represented conduit 4.

The valve cover 12 is provided with a tubular portion 12b for guiding the valve shaft 7, and with a recess 12a for limiting angular travel A3=270 degrees corresponding to the LPG Qmin. The casing 12 is made economically by die-stamping operations only. The economical cost of moulding two types of control knob 9, with and without integral lug 14 for guiding its rotation, is also low.

Besides that described above, other embodiments of the invention are possible. Half of the control knob 9 units of the kind applied to the NG appliance, may be provided with some integrated guiding means 14 on the control knob 9, and interact with some part of the cooking appliance 1 associated with the panel 2, in order another limit position A2 to be arranged of shorter rotation travel than that imposed by the actuating shaft. Likewise, the actuating shaft being the same for all the valve units 3, may have a different stop means for limiting angular travel A3 and interact with a part of the valve body other than the cover 12, having an effect and advantage similar as is described herein.

The arrangement of the two different stop means 12a and 20, respectively in the valve body 3a and on the control panel 2, each one with a pre-set circular extension, matches up with the two angular travels whose angular space A3–A2 existing between them, corresponds to that of the two hole passages 18 and 19, which are calibrated respectively for a constant NG Qmin and a constant LPG Qmin. In this way, a single valve unit 3 is used, without having to make any adjustment, valid for any type of gas supplied to the cooking appliance 1.

What is claimed is:

1. Gas cooking appliance adapted for a supply with different types of gaseous fuel, natural gas (NG) or liquefied petroleum gas (LPG), equipped with one or more regulating valves (3) of the rotary regulator organ (6) type, comprising:

a regulating valve (3) having a valve body (3a) provided with a housing for the regulator organ (6), an inlet conduit (4) and an outlet conduit (5), and an actuating shaft (7) mounted salient from a control panel (2) on the cooking appliance (1), wherein a regulated gas flow "Q" is directed towards the outlet conduit (5) to a cooking appliance burner adapted to one of these types of gas, said rotary regulator organ (6) provided with a revolution peripheral surface and various peripheral through openings (16–19) for the passage of a regulated flow "Q" to a central chamber (8) in communication with said outlet conduit (5), the passage openings being superimposed in alignment with said inlet conduit (4), successively in function of a respective angular position of the regulator organ (6), wherein, starting from an initial valve closed "OFF" position (A1,A1/A2,A2,A3), in accordance with each one of said angular positions (A1,A1/A2,A2,A3) of the regulating organ (5), three different possible flows, a constant maximum flow "Qmax", a constant minimum flow "Qmin", and an intermediate flow "Qint" between them, are supplied to the outlet conduit (5), in function of the area of the through opening (16–19) facing the inlet conduit (4), said actuating shaft (7) provided with a means (13) for guiding the angular travel (A3) of the regulator organ (6), interacting with a rotation stop means (12a) in the valve body (12a), an interchangeable control knob (9) fitted at the free end of the actuating shaft (7), provided with a integral means (14) for guiding said angular travel (A2) and interacting with a rotation stop means (20) in the control panel (2) of the appliance, wherein said rotation stop means (12a) in the valve body (12a) determines an angular position A2 of the regulating organ (6), for the supply of a first flow Qmin through one of said openings (18), calibrated for one type of gas (NG), and said rotation stop means (20) in the control panel (2) determines an angular position A3 successive to the prior position A2, for the supply of a second flow Qmin for another type of gas (LPG), through a second calibrated opening (19) spaced apart from the former.

2. The gas cooking appliance according to claim 1, wherein the regulator organ (6) comprises a series of said various peripheral openings (16–19), aligned in the rotational direction for the supply of said Qmax, Qint and first and second Qmin flows of either of the N or LP gas types, being of these two successive holes (18, 19) calibrated for the supply of the respective constant Qmin, and positioned angularly at the end of a respective travel A2, A3, and said guide means (14) on the control knob (9) comprises an integral shoulder or lug (14) on a base (9a) facing the control panel (2), which presents a circular slide groove (20) establishing the travel extension A2, and one control knob (9) fitted to the actuating shaft (7) is chosen between two different units available, with or without said lug (14) depending in either case on the type of gas, NG or LPG, supplied to the cooking appliance (1).

3. The gas cooking appliance according to claim 1, wherein said guide means on the control knob (9) comprises a shoulder or lug (14) on its base (9a) facing the control panel (2), which presents a circular slide groove (20) establishing the rotation stop at a first angular position A2, and said guide means (13) on the actuating shaft (7) comprises a radial pin (13) interacting with a recess (12a) in the valve cover (12), which establishes the rotation stop at a second angular position A3.

* * * * *

UNITED STATES PATENT AND TRADEMARK OFFICE
CERTIFICATE OF CORRECTION

PATENT NO. : 7,156,370 B2  Page 1 of 1
APPLICATION NO. : 11/106881
DATED : January 2, 2007
INVENTOR(S) : Iñigo Albizuri It is certified that error appears in the above-identified patent and that said Letters Patent is hereby corrected as shown below:

Column 5, lines 10 and 11, "said rotation stop means (12a) in the valve body (12a)" should be replaced with -- said rotation stop means (20) in the control panel (2) --;

Column 5, lines 14 and 15, "said rotation stop means (20) in the control panel (2)" should be replaced with -- said rotation stop means (12a) in the valve body (3a) --.

Signed and Sealed this

Thirteenth Day of May, 2008

JON W. DUDAS
*Director of the United States Patent and Trademark Office*